B. Benson.
Manufacture of Silk.
N° 1,468. Patented Jan. 10, 1840.

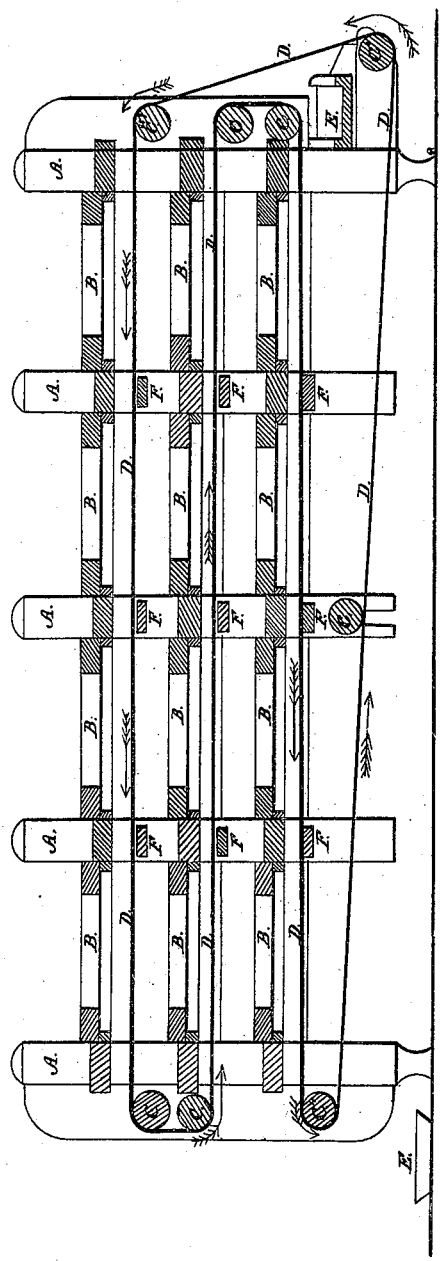

UNITED STATES PATENT OFFICE.

BENJAMIN BENSON, OF SMYRNA, DELAWARE.

COCOONERY FOR REMOVING FILTH, &c., FROM HURDLES.

Specification of Letters Patent No. 1,468, dated January 10, 1840.

*To all whom it may concern:*

Be it known that I, BENJAMIN BENSON, of Smyrna, in the county of Kent and State of Delaware, have invented an improvement in the hurdle-frames and their appendages for the feeding of silkworms and also of a lodgment to be used in conjunction therewith for the purpose of enabling the worms to spin their cocoons; and I do hereby declare that the following is a full and exact description thereof, the same being intended as an improvement on the hurdle for rearing and feeding silkworms for which Letters Patent of the United States were granted to Gamaliel Gay on October 6, 1835.

To my hurdle frame, I append an endless, revolving apron of cloth, or other suitable material, for the purpose of readily removing the filth from the worms, which endless apron I construct in a manner that renders it much more convenient and useful than the aprons employed in the machine of Gamaliel Gay, upon which this is an improvement.

Figure 1:
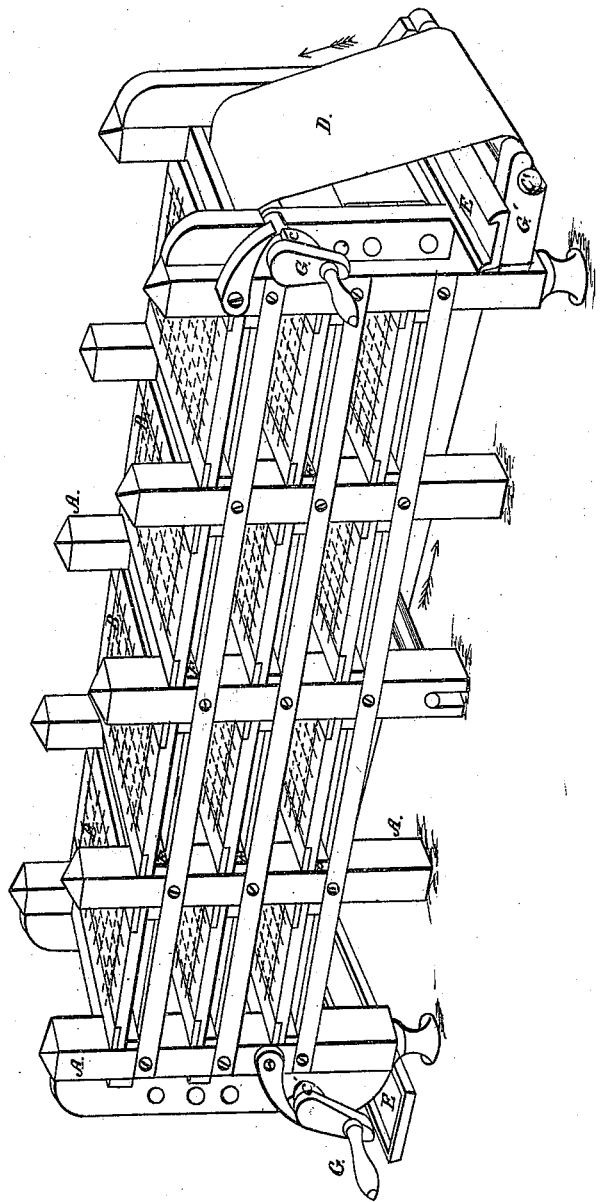

Figure 1, in the accompanying drawing, is a perspective view of my hurdle frame, and Fig. 2, a longitudinal, vertical section thereof, showing the manner of arranging the endless, revolving apron, and the rollers over and under which it passes in its revolution.

A, A, is the general hurdle frame, and B, B, the hurdles placed thereon, in which there is not anything novel or peculiar.

C, C, C, are the rollers around which the endless apron passes, said apron being marked D, D, and being conducted by the rollers under the different ranges of hurdles, in a manner which is distinctly shown in the drawing. I intend, in general, to make the arms $G^1$, Fig. 1, which sustain the roller $C^1$, adjustable, so that they may be slid in or out, and be tightened by wedges, or screws, to regulate the strain of the apron.

The fifth from the worms will fall through the meshes, or openings, in the hurdles, and by turning the winches G, G, shown as attached to the rollers $C''$, and $C'''$, so as to move the apron in the direction of the arrows, the filth accummulated on them will fall into boxes, or other receivers, suitably placed at the ends of the frame, as at E, E. To support the apron, and prevent its swagging, I place bars transversely, as at F, F, said bars making a part of the main frame. In the drawings, the gudgeons of the respective rollers are represented as of wood, but I intend to substitute iron therefor, not only as being more durable, but as moving with much less friction.

Figure 3:
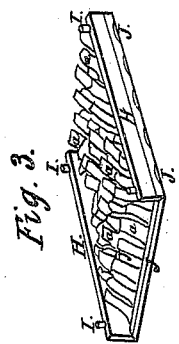

In the apparatus for which Letters Patent were obtained by Gamaliel Gay, a separate cloth, or apron, was appropriated to each hurdle, and the rollers upon which it was wound were placed at the sides of the frame, rendering it necessary to leave a much larger space between the respective frames, than upon my plan, and greatly increasing its complexity, and the labor of using it. I have also devised a new kind of frame, or lodgment, upon which the worms are to spin their cocoons; which frame, or lodgment, is to be placed over the hurdles when the worms are ready to spin. This frame, or lodgment, is shown at Fig. 3, and is drawn in an inverted position, for the purpose of showing, the more distinctly, the manner in which it is made. This frame is to be of the same length and width with the hurdles upon which it is to be placed; it consists of two side pieces of wood H, H, of the length of the hurdle, and about six inches wide; or the sides may be made narrower, and have knobs or pins, I, I, on their edges, which will raise the frame to that height, when placed upon the frame of the hurdle. These side pieces I connect together by nailing on their edges laths, or slats, J, J, equal in length to the width of the hurdle, and these slats I cover with muslin or cloth of any suitable kind; or with thin boards or other article which will answer the purpose. Between the cloth and the slats I interpose strips of stiff paper, *a, a*, or other suitable material, one inch, more or less, in width, which is to hang down in a fringe-like manner, as shown at *a, a, a*, and will thus serve for the worms to climb upon, and will also furnish a most suitable and convenient attachment for their cocoons.

Having thus fully described the nature of my improvements and the manner in which they are to operate, what I claim therein, and desire to secure by Letters Patent, is,

1. The within described mode of arranging an endless revolving apron, passing length-wise of a general frame, containing several tiers of hurdles for feeding silkworms; it being constructed in such manner as that one apron shall serve to collect, and convey, the filth from all the hurdles, in the way herein set forth.

2. I likewise claim the particular manner herein described of constructing the frames for a lodgment for cocoons, said frames consisting of side pieces, slats, a covering of cloth, and strips of paper, or other material, combined, or united together, substantially as set forth, and adapted to be placed over the feeding hurdles, within the hurdle frame.

BENJ. BENSON.

Witnesses:
GEORGE WEST,
THOS. P. JONES.